US008240567B2

(12) United States Patent
Takeuchi et al.

(10) Patent No.: US 8,240,567 B2
(45) Date of Patent: Aug. 14, 2012

(54) COMMUNICATION MANAGEMENT DEVICE, COMMUNICATION MANAGEMENT METHOD, AND COMMUNICATION MANAGEMENT PROGRAM

(75) Inventors: Nozomi Takeuchi, Tokyo (JP); Katsuaki Fujihara, Tokyo (JP)

(73) Assignee: NEC Corporation, Tokyo (JP)

( * ) Notice: Subject to any disclaimer, the term of this patent is extended or adjusted under 35 U.S.C. 154(b) by 382 days.

(21) Appl. No.: 12/530,375

(22) PCT Filed: Feb. 28, 2008

(86) PCT No.: PCT/JP2008/053546
§ 371 (c)(1),
(2), (4) Date: Sep. 8, 2009

(87) PCT Pub. No.: WO2008/114594
PCT Pub. Date: Sep. 25, 2008

(65) Prior Publication Data
US 2010/0102124 A1    Apr. 29, 2010

(30) Foreign Application Priority Data
Mar. 22, 2007    (JP) .................................. 2007-074588

(51) Int. Cl.
*G06K 7/08* (2006.01)
(52) U.S. Cl. ...................................................... 235/451
(58) Field of Classification Search .................... 235/451
See application file for complete search history.

(56) References Cited

U.S. PATENT DOCUMENTS

| 2007/0063041 | A1* | 3/2007 | Kamiyama et al. | 235/451 |
| 2007/0272752 | A1* | 11/2007 | Nakatsugawa et al. | 235/451 |
| 2008/0059976 | A1* | 3/2008 | Miura | 719/316 |

FOREIGN PATENT DOCUMENTS

| JP | 2003016398 A | 1/2003 |
| JP | 2003328595 A | 11/2003 |
| JP | 2004054305 A | 2/2004 |
| JP | 2005301489 A | 10/2005 |
| JP | 2006113719 A | 4/2006 |
| JP | 2006339959 A | 12/2006 |
| WO | 0207325 A | 9/2002 |

OTHER PUBLICATIONS

International Search Report for PCT/JP2008/053546 mailed May 20, 2008.
Overview of FeliCa the FeliCa system, [online], Sony Corporation, [searched on Feb. 16, 2007], the Internet <URL: http://www.sony.co.jp/Products /felica/abt/dvs.html>.

* cited by examiner

*Primary Examiner* — Thien M. Le
*Assistant Examiner* — Christle Marshall

(57) ABSTRACT

To authenticate etc. an IC card upon execution of an IC locking function by utilizing a privacy function. A communication management device has an IC, an IC card lock setting part, and a main control part. The IC includes an IC card function part for providing various kinds of services and a privacy function setting part for storing information for controlling the services provided by the IC card function part. The IC card lock setting part manages setting for locking the operation of the IC card function part. When locking managed by the IC card lock setting part is unlocked, the main control part forcibly stops the services provided by the IC card function part according to privacy information set by the privacy function setting part.

14 Claims, 3 Drawing Sheets

COMMUNICATION MANAGEMENT DEVICE, COMMUNICATION MANAGEMENT METHOD, AND COMMUNICATION MANAGEMENT PROGRAM

TECHNICAL FIELD

The present invention relates to a communication management device, a communication management method and a communication management program that manage communications performed by a non-contact method.

BACKGROUND ART

Non-contact IC card technology having a nonvolatile memory and a wireless communication chip (FeliCa®; see Non-Patent Document 1) has recently developed. In the non-contact IC card technology, a non-contact IC is incorporated into various types of cards, and by holding this IC card over a reader/writer, it is possible for the IC card to transmit and receive data with the reader/writer. Further, since the non-contact IC cards use the electric power generated based on electromagnetic waves radiated from the reader/writer as their power source, they do not need to include a battery or the like therein so that the structure thereof can be simplified and that they never run out of battery to be unusable. Therefore, the IC cards are utilized, for example, as a prepaid IC card (Suica®), a credit card for electronic payments (Edy®), an employee ID card, and the like.

Recently, attempts have been made to apply the functions of the non-contact IC card to wireless telephone devices. Since the wireless telephone device stores various kinds of information, the importance of lock function as a measure for preventing the information from leaking has been increasing. Typically, wireless telephone devices have various lock functions that become available when a personal identification number (PIN) is inputted through user's key operation. The lock functions are such as: an all-lock, where the functions other than the limited ones such as power on/off or emergency originating call are not usable; a mail security setting, where mails are not to be displayed; etc.

It is possible to apply the lock function of the non-contact IC cards to the lock function of the wireless telephone devices. The lock function of the non-contact IC card can be achieved by turning off the power of an IC (Faver) that provides services offered by the non-contact IC card, for example electronic payment service such as Edy®.

As a technique to unlock the above-mentioned lock functions, the operation, for example, to input a PIN at an unlock screen of the above-described all-lock or mail security setting is required. Alternatively, as disclosed in Patent Document 1 below, the unlocking can be achieved by holding another external IC card over a reader/writer to which FeliCa IDm has been registered in advance, after a simple operation, in order to verify the FeliCa IDm which is the unique data of the external IC card. With this, it is possible to prevent improper unlocking because the unlocking is not able to be achieved if the person unlocking does not have the card with him/her. This also is a convenient function because the time for inputting the PIN can be saved if the user has the card with him/her. Further, the above-mentioned authentication for performing unlocking can be utilized as an IC card authentication function.

Patent Document 1: Japanese Unexamined Patent Application Publication No. 2004-54305

Non-Patent Document 1: Overview of FeliCa The FeliCa system, [online], Sony Corporation, [searched on Feb. 16, 2007], the Internet <URL: http://www.sony.co.jp/Products/felica/abt/dvs.html>

DISCLOSURE OF THE INVENTION

Problems to be Solved by the Invention

However, the above-mentioned IC card authentication function has the following disadvantage. That is, while IC card lock is functioning, the power of the IC (Faver) is off, so that the FeliCa IDm of the external IC card is not able to be read out; however, in order to perform the authentication, the power of the IC (Faver) has to be turned on. Nonetheless, if the power of the IC (Faver) is turned on, the IC card function automatically activates, and it cannot be stopped. As a result, if the power of the IC is turned on, the information recorded within the IC card may be seen from outside.

Meanwhile, there is yet a high demand for achieving the unlocking with the above-mentioned external IC card. For example, if services relating to a commutation pass and a credit card are registered as IC card functions of a wireless telephone device, the IC card function is desirably set to a locking mode while the wireless telephone device is not in use in consideration of the case in which the wireless telephone device is being lost.

However, for the frequently-used services such as a commutation pass, the unlocking operation may be a bother. For such a case, it will be convenient if the locking can be unlocked by merely holding an external IC card over a reader/writer after a simple operation.

It is an object of the present invention to provide a communication management device, a communication management method and a communication management program that enable authentication of an IC card and the like by using a privacy function while IC card lock is functioning.

Means for Solving the Problems

In order to achieve the object, the communication management device according to the present invention, which manages communications performed by a non-contact method, includes an IC, an IC card lock setting part, and a main control part. The IC includes an IC card function part that provides various kinds of services, and a privacy function setting part that stores information for controlling the services provided by the IC card function part. The IC card lock setting part manages the setting for locking the operation of the IC card function part. The main control part forcibly stops the services provided by the IC card function part according to the privacy information set by the privacy function setting part when the locking by the IC card lock setting part is unlocked.

In the above example, the present invention is constructed as a communication management device serving as hardware; however, the construction is not limited thereto. The present invention may be constructed as a communication management method, or a communication management program serving as software.

The communication management program according to the present invention controls and drives a computer constituting the communication management device that manages communications performed by a non-contact method. The communication management program uses an IC including: an IC card function part that provides various kinds of services, and a privacy function setting part that stores information for controlling the services provided by the IC card function part. The communication management program is constructed as causing the computer to execute the functions of: locking the operation of the IC card function part, and forcibly stopping the services provided by the IC card function part according to privacy information set by the privacy function setting part when the locking of the IC card function part is unlocked.

The communication management method according to the present invention, which manages communications performed by a non-contact method, uses an IC including: an IC card function part that provides various kinds of services, and a privacy function setting part that stores information for controlling the services provided by the IC card function part. The communication management method is constructed as forcibly stopping the services provided by the IC card function part according to privacy information set by the privacy function setting part when locking of the IC card function part is unlocked.

Advantages of the Invention

According to the present invention, when the locking mode of the IC card function part incorporated in the IC is unlocked, it is possible to forcibly stop the services provided by the IC card function part, according to the privacy information set by the privacy function setting part, thereby preventing inadvertent provision of various services provided by the IC card function part.

BEST MODE FOR CARRYING OUT THE INVENTION

Below, the exemplary embodiment of the invention will be described in detail with reference to the drawings.

FeliCa is a non-contact IC card technology. In the FeliCa technology, the communication between the reader/writer and the card is performed by electromagnetic waves radiated from the reader/writer.

By the way, recent wireless telephone devices are likely to include IC card functions of FeliCa as standard equipment. The wireless telephone devices incorporating FeliCa have various lock functions with respect to the services, which will be activated by inputting a PIN. The lock functions are, for example, an all-lock where functions other than the limited ones such as power on/off or emergency originating call are not usable; a mail security setting where mails are not to be displayed; and the like. Since various types of information are now stored in the wireless telephone devices, the importance of lock function has increased.

Since many of the services provided by the IC card function of FeliCa relate to accounting, the lock function of the IC card function has become one of the important functions. The IC card lock function can be implemented by turning off the power of the IC (Faver) within the wireless telephone device, providing services.

Until now, the FeliCa service provided to wireless telephone devices had merely been an IC card function. However, since the IC providing the FeliCa service has started to support a reader/writer function in addition to the IC card function, the wireless telephone devices from now on will be capable of having the reader/writer function as well.

Accordingly, by utilizing the reader/writer function of FeliCa, it is possible to provide an IC card authentication function that provides unlock function of the lock function. Namely, compared to inputting a PIN at the unlock screen of the above mentioned all-lock or mail security setting, the unlocking can be implemented, after a simple operation, by holding an external IC card (non-contact IC), which has been registered in advance, over the reader/writer of the wireless telephone device in order to perform verification by reading out the FeliCa IDm for external IC card authentication with the reader/writer of the wireless telephone device. If the external IC card is not with the user of the wireless telephone device, the unlocking of the wireless telephone device cannot be implemented; while if the external IC card is with the user, the time for inputting the PIN to the wireless telephone device can be saved, making the function to be effective.

However, the external IC card authentication function includes a problem when applied to the IC card lock function. This is because when the IC card lock is functioning, the power of Faver is off, so that the FeliCa Ian of the external IC card is not able to be read out while then. For implementing the IC card authentication function, the power of the Faver needs to be turned on; however, if the power of the Faver is turned on, the IC card function automatically activates and the activation mode can not be stopped. Therefore, even though the user has set the IC card function to an off (stop) mode, the IC card function becomes available. This will be a significant problem because many of the services provided by the Faver, incorporated in the wireless telephone device, relate to accounting.

In the meantime, the IC card lock function itself is also expected to be unlocked with the external IC card function. For example, if commutation pass service and credit card service have been registered as IC card functions of the wireless telephone device, in consideration of the case in which the wireless telephone device is lost, the IC card function is desirably set to locking mode. However, for the frequently-used services such as a commutation pass, the unlocking operation may be found as a bother. For such a case, it will be convenient if the IC card authentication function can be used because, by this, unlocking can be implemented by merely holding the external IC card over a reader/writer after a simple operation.

The communication management device according to the exemplary embodiment of the invention enables IC card authentication or the like upon execution of the IC lock function by using a privacy function. Hereinafter, an example of communication management device according to the exemplary embodiment of the invention, which is incorporated in a wireless telephone device 1, will be described.

As shown in FIG. 1, the communication management device according to the exemplary embodiment of the invention manages communications performed by a non-contact method, and is incorporated in the wireless telephone device 1. The communication management device includes an IC 10, an IC card lock setting part, and a main control part 15.

The IC 10 was formed with the non-contact IC technology, and includes an IC card function part 11a and a privacy function setting part 11b. The IC 10 further includes a reader/writer 12 that obtains information managed by a non-contact IC (external card) 17 by supplying electromagnetic waves. The non-contact IC (external card) 17 is portable for users, and this non-contact IC 17 is used when performing IC card authentication with respect to the IC 10.

The IC card function part 11a provides various kinds of services. The privacy function setting part 11b stores information for controlling the services provided by the IC card function part 11a, i.e., information for forcibly stopping the services provided by the IC card function part 11a. Accordingly, by turning on the privacy function of the privacy function setting part 11*b*, it is possible for the IC card function part 11*a* to operate as if the services registered to the IC card function part 11*a* of the IC (Faver) 10 are not registered.

The IC card lock setting part manages the setting for locking the operation of the IC card function part 11*a*, and includes an IC card lock setting storage part 14 and a FeliCa IDm storage part 13. The IC card lock setting storage part 14 stores information for setting the IC card function part 11*a* to a locked mode. The information (lock information) stored by the IC card lock setting storage part 14 is inputted by the user's operation through an operation part 16, and stored at the IC card lock setting storage part 14 under the control of the main control part 15.

The FeliCa IDm storage part 13 stores information of FeliCa IDm corresponding to the FeliCa IDm set for the non-contact IC (external IC) 17, which will be the target of the verification upon IC card authentication. The information (FeliCa IDm) stored by the FeliCa IDm storage part 13 is inputted by the user's operation through the operation part 16, and stored at the FeliCa IDm storage part 13 under the control of the main control part 15.

In addition to the function of controlling the overall operation of the wireless telephone device 1, the main control part 15 has a function of forcibly stopping the services provided by the IC card function part 11*a* of the IC 10 according to the privacy information set by the privacy function setting part 11*b* when the locking set by the IC card lock setting part (13, 14) is unlocked. Through the operation part 16, information necessary for operating the wireless telephone device 1 is inputted by the user, in addition to the information necessary for the above-mentioned operation.

In the above description, the communication management device according to the exemplary embodiment of the invention is constructed by the configuration as hardware; however, it is not limited thereto. The communication management device may be constructed as software for causing a computer to execute the functions of the above-mentioned configuration as hardware.

Now, the operation of the exemplary embodiment of the invention will be described with reference to FIGS. 1, 2 and 3.

First, the operation to lock the IC card function part 11*a* of IC 10 will be described based on FIG. 2.

When the operation part 16 is operated by a user (step 201 of FIG. 2) and the operation is directed to IC card lock setting (step 201 of FIG. 2), if the IC card lock setting information indicates to turn on the IC card locking (step 202 of FIG. 2; YES), upon receipt of necessary information for the operation of the IC card lock setting from the operation part 16, the main control part 15 stores, at the privacy function setting part 11*b* within the IC (Faver) 10, the information that the privacy setting is on (step 203 of FIG. 2), whereby the privacy function setting part 11*b* is allowed to retain information for controlling the services provided by the IC card function part 11*a*.

If the main control part 15 stores, at the privacy function setting part 11*b* within the IC (Faver) 10, the information that the privacy setting is on (step 203 of FIG. 2), the main control part 15 turns the power of the IC (Faver) 10 off (step 204 of FIG. 2).

The main control part 15 then stores at the IC card lock setting storage part 14 the information that the IC card lock is on (step 205 of FIG. 2).

Next, unlocking operation of IC card lock will be described based on FIG. 2.

Upon receipt of information to unlock the IC card lock from the operation part 16 (step 201 and step 202 of FIG. 2; NO), the main control part 15 turns the power of the IC (Faver) 10 on (step 206 of FIG. 2).

The main control part 15 then stores, at the privacy function setting part 11*b* within the IC (Faver) 10, the information that the privacy setting is off (step 207 of FIG. 2). The main control part 15 further stores at the IC card lock setting storage part 14 the information that the IC card lock is off (step 208 of FIG. 2).

As described, when the information that the privacy setting is on is stored at the privacy function setting part 11*b*, the power of the IC 10 is turned off and the operation of the IC card function part 11*a* will be locked. Conversely, when the information that the privacy setting is off is stored at the privacy function setting part 11*b*, the power of the IC 10 is turned on and the locking for the operation of the IC card function part 11*a* will be unlocked.

Next, the operation of IC card authentication will be described based on FIG. 3.

Upon receipt of the information to start IC card authentication from the operation part 16 (step 301 of FIG. 3), the main control part 15 reads out the lock setting mode from the IC card lock setting storage part 14 (step 302 of FIG. 3).

If the information read out from the IC card lock setting storage part 14 indicates that the IC card lock setting is on (step 302 of FIG. 3; YES), the main control part 15 turns the power of the IC (Faver) 10 on (step 303 of FIG. 3).

The main control part 15 then activates the reader/writer 12 of the IC (Faver) 10, and controls the reader/writer 12 to radiate electromagnetic waves so that the information managed by the non-contact IC (external card) 17, i.e., FeliCa IDm can be obtained (step 304 of FIG. 3).

If the FeliCa IDm of the non-contact IC 17 is detected, (step 304 of FIG. 3; YES), the main control part 15 verifies the detected FeliCa IDm with the data of the FeliCa IDm storage part 13 (step 305 of FIG. 3).

If the FeliCa IDm of the non-contact IC corresponds to the data of the FeliCa IDm storage part 13, the main control part 15 determines it as an IC card authentication success (step 306 of FIG. 3). If the FeliCa IDm of the non-contact IC does not correspond to the data of the FeliCa IDm storage part 13, the main control part 15 determines it as an IC card authentication failure (step 307 of FIG. 3).

The main control part 15 turns the power of the IC (Faver) 10 off if the IC card lock has been set to on mode (step 309 of FIG. 3).

For the case the IC card authentication ends up in success, the main control part 15 judges if the IC card setting is on or off, and when the IC card lock has been set to on (step 308 of FIG. 3; YES), the main control part 15 turns the power of IC (Faver) 10 off (step 309 of FIG. 3).

For the case the IC card authentication ends up in failure, the main control part 15 judges if the IC card lock setting is on or off, and when the IC card lock has been set to on (step 308 of FIG. 3; YES), the main control part 15 turns the power of IC (Faver) 10 off (step 309 of FIG. 3).

Also, when the main control part 15 receives the information to start IC card authentication from the operation part 16 (step 301 of FIG. 3), if the information read-out from the IC card lock setting storage part 14 indicates that the IC card lock setting is not on (step 302 of FIG. 3; NO), the main control part keeps the power of the IC (Faver) 10 on.

As described, when the lock setting mode of the IC card lock setting storage part 14 is set to the mode of locking the IC card function part 11*a*, and if the IC card lock is unlocked then, the main control part 15 forcibly stops the services provided by the IC card function part 11*a* according to the information stored by the privacy function setting part 11*b*.

As shown in FIG. 3, when the lock setting mode of the IC card lock setting storage part 14 is set to the mode of locking the IC card function part 11a, and if the IC card lock is unlocked then, by combining the above-described control by the main control part 15 with respect to the IC card function part 11a and the IC card authentication operation with respect to the IC 10, the main control part 15 can forcibly stop the services provided by IC card function part 11a according to the information stored at the privacy function setting part 11b, unless the IC card authentication with respect to the IC is succeeded.

According to the exemplary embodiment of the invention, when the locking mode of the IC card function part included in the IC is unlocked, the IC card function part is not to be activated but the services provided by the IC card function part will be forcibly stopped according to the privacy information set by the privacy function setting part, thereby preventing inadvertent provision of various services by the IC card function part.

According to the exemplary embodiment of the invention, even if the IC lock is unlocked and that the IC is powered, by incorporating the IC card authentication operation with respect to the IC, the services provided by the IC card function part will be forcibly stopped, according to the privacy information set by the privacy function setting part, unless the IC card authentication with respect to the IC is succeeded, thereby preventing inadvertent leakage of personal information stored at the IC card function part or inadvertent provision of various services.

According to the exemplary embodiment of the invention, various services of the IC card function part will not be performed unless the IC card authentication with respect to the IC is succeeded. Therefore, it is possible to perform IC card authentication with respect to the IC without having the various service being performed by the IC card function part.

Further, the main control part 15 may be configured to perform the authentication within a set time. In that case, the main control part 15 renders the authentication after the set time invalid. In this manner, by setting a time for the IC card authentication with respect to the IC 10, the activating time of the reader/writer 12, during then the IC card authentication is performed, can be made minimum, so that the IC card authentication can be implemented maintaining high level security.

Additionally, although the description has focused on the case in which the present invention is applied to a wireless telephone device, the application is not limited thereto. The present invention can be also applied to various kinds of devices that use FeliCa IC card function and reader/writer function in the same manner.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is the National Phase of PCT/JP2008/053546, filed Feb. 28, 2008, which is based upon and claims the benefit of priority from Japanese patent applications No. 2007-074588, filed on Mar. 22, 2007, the disclosure of which is incorporated herein in its entirety by reference.

INDUSTRIAL APPLICABILITY

According to the present invention, it is possible to perform IC card authentication with respect to an IC (Faver) without having the services performed by the IC card function part. Thus, the application field of the non-contact IC card technology can be broadened.

Figure 1:
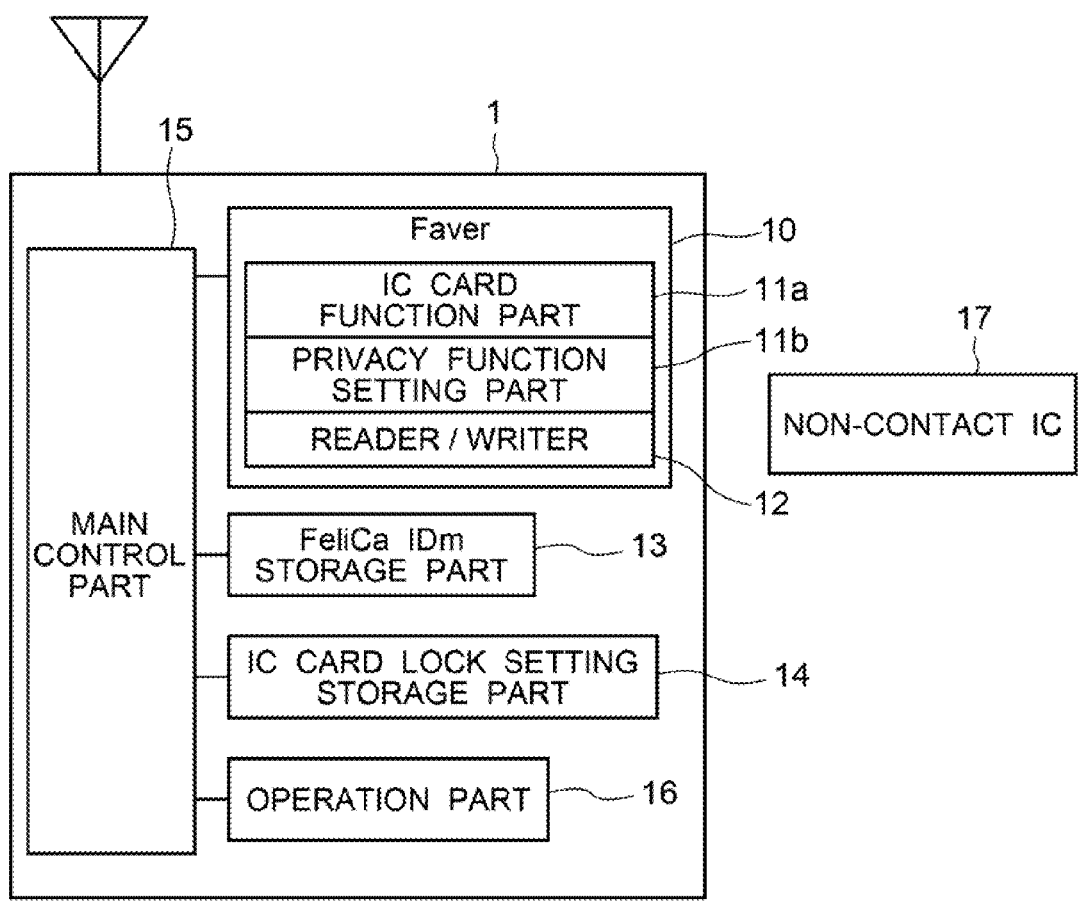
FIG. 1 is a block diagram showing the communication management device according to the exemplary embodiment of the invention.
Figure 2:
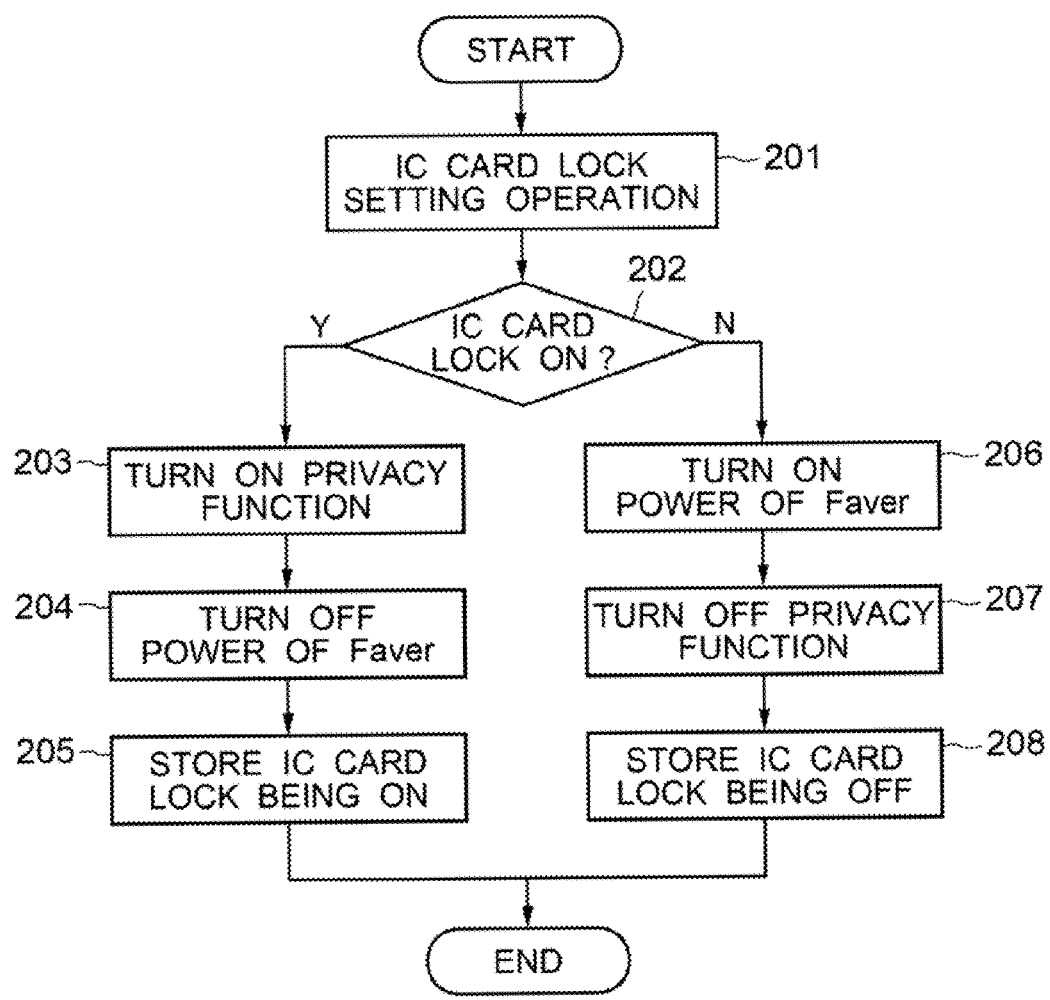
FIG. 2 is a flowchart describing the card lock setting/releasing according to the exemplary embodiment of the invention.
Figure 3:
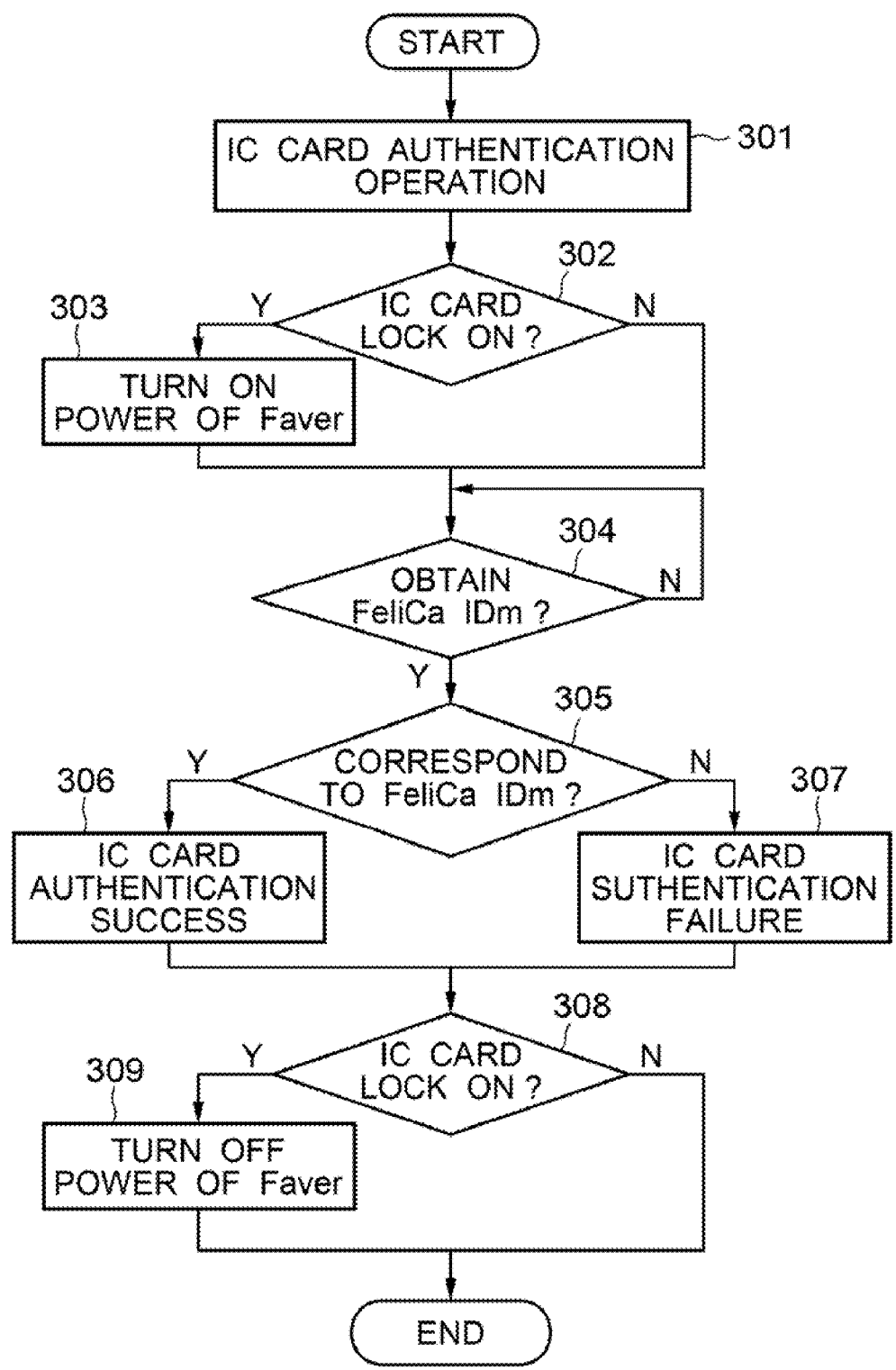
FIG. 3 is a flowchart describing the IC card authentication operation according to the exemplary embodiment of the invention.

REFERENCE NUMERALS 1 wireless telephone device
10 IC (Faver)
11 IC card function part
12 reader/writer
13 FeliCa IDm storage part
14 IC card lock setting storage part

What is claimed is:

1. A communication management device that manages a communication performed by a non-contact method, comprising:
an IC, an IC card lock setting part, and a main control part,
wherein the IC includes: an IC card function part that provides various kinds of services, a privacy function setting part that stores information for controlling the services provided by the IC card function part, and a reader/writer that obtains information managed by a non-contact IC by supplying an electromagnetic wave,
wherein the IC card lock setting part manages setting for locking an operation of the IC card function part,
wherein the main control part forcibly stops the services provided by the IC card function part according to privacy information set by the privacy function setting part when locking managed by the IC card lock setting part is unlocked, and
wherein the main control part performs authentication according to the information obtained by the reader/writer while forcibly stopping the service provided by the IC card function part.

2. The communication management device as claimed in claim 1, wherein the main control part activates the IC card function part if the authentication is true.

3. The communication management device as claimed in claim 1, wherein the non-contact IC is portable.

4. The communication management device as claimed in claim 1, wherein the main control part performs the authentication within a set time.

5. The communication management device as claimed in claim 4, wherein the main control part renders the authentication after the set time invalid.

6. A non-transitory computer readable recording medium storing a communication management program that drives and controls a computer constituting a communication management device that manages a communication performed by a non-contact method,
the program using an IC that includes an IC card function part that provides various kinds of services, a privacy function setting part that stores information for controlling the services provided by the IC card function part, and a reader/writer that obtains information managed by a non-contact IC by supplying an electromagnetic wave, the program causing the computer to execute the functions of:

locking operation of the IC card function part;

forcibly stopping the services provided by the IC card function part according to privacy information set by the privacy function setting part when locking of the IC card function part is unlocked, and performing authentication according to the information obtained by the reader/writer while forcibly stopping the service provided by the IC card function part.

7. The non-transitory computer readable recording medium storing the communication management program as claimed in claim 6, further causing the computer to execute the function of activating the IC card function part if the authentication is true.

8. The non-transitory computer readable recording medium storing the communication management program as claimed in claim 6, further causing the computer to execute the function of performing the authentication within a set time.

9. The non-transitory computer readable recording medium storing the communication management program as claimed in claim 8, further causing the computer to execute the function of rendering the authentication after the set time invalid.

10. A communication management method for managing a communication performed by a non-contact method, the communication management method comprising:

using an IC that includes an IC card function part that provides various kinds of services, a privacy function setting part that stores information for controlling the services provided by the IC card function part;

obtaining information managed by a non-contact IC by supplying an electromagnetic wave from a reader/writer incorporated in the IC;

forcibly stopping the services provided by the IC card function part according to privacy information set by the privacy function setting part when locking of the IC card function part is unlocked; and performing authentication according to the information obtained by the reader/writer while forcibly stopping the services provided by the IC card function part.

11. The communication management method as claimed in claim 10, further comprising activating the IC card function part if the authentication is true.

12. The communication management method as claimed in claim 10, further comprising performing the authentication within a set time.

13. The communication management method as claimed in claim 12, further comprising rendering the authentication after the set time invalid.

14. A communication management device that manages a communication performed by a non-contact method, comprising:

an IC, an IC card lock setting part, and a main control part, wherein the IC includes: IC card function means for providing various kinds of services, privacy function setting means for storing information for controlling the services provided by the IC card function means, and a reader/writer means that obtains information managed by a non-contact IC by supplying an electromagnetic wave, wherein the IC card lock setting part manages setting for locking an operation of the IC card function means, wherein the main control part forcibly stops the services provided by the IC card function means according to privacy information set by the privacy function setting means when locking managed by the IC card lock setting part is unlocked, and wherein the main control part performs authentication according to the information obtained by the reader/writer means while forcibly stopping the service provided by the IC card function means.

* * * * *